US008332252B2

(12) United States Patent
Buisson et al.

(10) Patent No.: US 8,332,252 B2
(45) Date of Patent: Dec. 11, 2012

(54) SYSTEM AND METHOD OF GENERATING BUSINESS CASE MODELS

(75) Inventors: Marie-Noelle Buisson, Paris (FR); Julien Chabrolles, Montesson (FR); Philippe Tunica, Osny (FR)

(73) Assignee: International Business Machines Corporation, Armonk, NY (US)

( * ) Notice: Subject to any disclaimer, the term of this patent is extended or adjusted under 35 U.S.C. 154(b) by 1358 days.

(21) Appl. No.: 11/484,471

(22) Filed: Jul. 11, 2006

(65) Prior Publication Data

US 2007/0118417 A1 May 24, 2007

(30) Foreign Application Priority Data

Nov. 22, 2005 (EP) .................................... 05300958

(51) Int. Cl.
*G06F 17/30* (2006.01)
(52) U.S. Cl. ...................................................... 705/7.23
(58) Field of Classification Search .................. 705/7.23
See application file for complete search history.

(56) References Cited

U.S. PATENT DOCUMENTS

| 6,675,149 | B1 * | 1/2004 | Ruffin et al. ........................ 705/8 |
| 6,915,275 | B2 * | 7/2005 | Banerjee et al. ................ 705/26 |
| 6,965,877 | B2 * | 11/2005 | Banerjee et al. ................ 705/37 |
| 7,559,049 | B1 * | 7/2009 | Hemmat et al. ............... 717/102 |
| 2001/0032105 | A1 * | 10/2001 | Frye et al. .......................... 705/7 |
| 2002/0042751 | A1 | 4/2002 | Sarno |
| 2002/0059512 | A1 * | 5/2002 | Desjardins ........................ 713/1 |
| 2003/0097319 | A1 * | 5/2003 | Moldovan et al. ............. 705/35 |
| 2003/0130859 | A1 * | 7/2003 | Kennedy ........................... 705/1 |
| 2003/0139970 | A1 * | 7/2003 | Badura et al. ................... 705/26 |
| 2004/0078309 | A1 | 4/2004 | Norquist et al. |
| 2004/0143477 | A1 * | 7/2004 | Wolff ................................. 705/9 |
| 2005/0114829 | A1 * | 5/2005 | Robin et al. .................. 717/101 |
| 2007/0027701 | A1 * | 2/2007 | Cohn et al. ........................ 705/1 |
| 2007/0033211 | A1 * | 2/2007 | Berman et al. ................ 707/102 |

OTHER PUBLICATIONS

Thayer Watkins, "Cost Benefit Analysis", 1999, San Jose State University Economics Department, p. 1-12, see web site: http://web.archive.org/web/19990225143131/http://sjsu.edu/faculty/watkins/cba.htm.*

* cited by examiner

*Primary Examiner* — Romain Jeanty
(74) *Attorney, Agent, or Firm* — Schmeiser, Olsen & Watts; John Pivnichny

(57) ABSTRACT

A computer implemented system and method for evaluating the impact of a project implementation within a customer situation allows building a business case model for each category of products to be associated within the project implementation and then consolidating all the category business case models into a final general business case model.

18 Claims, 15 Drawing Sheets

SYSTEM AND METHOD OF GENERATING BUSINESS CASE MODELS

CROSS-REFERENCE TO RELATED APPLICATIONS

This application claims priority from EPO Application Serial No. EP05300958 filed on Nov. 22, 2005 and entitled SYSTEM AND METHOD OF GENERATING BUSINESS CASE MODELS.

FIELD OF THE INVENTION

The present invention is in the field of technology solution decision tools and relates more particularly to a system and method for automatically generating client contextual business cases models.

BACKGROUND OF THE INVENTION

In their quest for efficiency and competitive advantage, Information Technology (IT) users are always looking for ways to improve their computer infrastructures, whether at a hardware level (such as servers, storage) or at a software level or even at a facilities level. The IT spending decisions by companies in various industries are in most cases based on a demonstration of rigorous business case and concrete return on investment (ROI). There are various techniques and existing tools to provide business cases and ROI justifications. However, these tools and techniques, either manual or semi-automatic, have basic limitations which include, for example, but are not limited to: (a) not being flexible enough and time-consuming to customize; (b) being too generic for a requested customer environment; and (c) being limited to a specific industry.

An industry survey found that IT solution vendors could better align their business case efforts by addressing the business objectives (e.g., financial rules, key issues, and goals of corporate executives) of the customer and connecting them to their technology solutions transparently.

SUMMARY OF THE INVENTION

Briefly stated, a computer implemented system and method for evaluating the impact of a project implementation within a customer situation allows building a business case model for each category of products to be associated within the project implementation and then consolidating all the category business case models into a final general business case model.

According to an embodiment of the invention, a computer implemented method for evaluating the impact of a project implementation within a customer situation includes the steps of (a) determining one or more categories to be associated with the project implementation; (b) for each category, collecting customer data related to cost and duration; upon receiving the customer data, generating a business evolution of the customer situation if the project is not implemented; a business evolution of the customer situation if the project is implemented; a cost measurement of the implementation of the project; and building a category business case model using the business evolution and cost measurement previously generated; and (c) generating a global business case model by consolidating the category business case models previously built.

According to an embodiment of the invention, a system for evaluating the impact of a project implementation within a customer situation includes (a) means for determining one or more categories to be associated with the project implementation; (b) means for implementing for each category: means for collecting customer data related to cost and duration; upon receiving the customer data, means for generating: a business evolution of the customer situation if the project is not implemented; a business evolution of the customer situation if the project is implemented; a cost measurement of the implementation of the project; and means for building a category business case model using the business evolution and cost measurement previously generated; and (c) means for generating a global business case model by consolidating the category business case models previously built.

According to an embodiment of the invention, a computer program product, including a computer usable medium which includes computer usable program code for evaluating the impact of a project implementation within a customer situation, includes (a) computer usable program code for determining one or more categories to be associated with the project implementation; (b) computer usable program code for implementing in each category: collecting customer data related to cost and duration; upon receiving the customer data, generating: a business evolution of the customer situation if the project is not implemented; a business evolution of the customer situation if the project is implemented; a cost measurement of the implementation of the project; and for building a category business case model using the business evolution and cost measurement previously generated; and (c) computer usable program code for generating a global business case model by consolidating the category business case models previously built.

BRIEF DESCRIPTION OF THE DRAWINGS

FIGS. 7a-7b illustrate empty and completed 'Server Expense Base' worksheets.

FIG. 9 illustrates a 'Server Expense Target' worksheet.

FIG. 10 illustrates a 'Maintenance Target' worksheet.

DETAILED DESCRIPTION OF THE PREFERRED EMBODIMENT

For the sake of clarity, the main terms used along the description are initially described, but one skilled in the art should also refer to any glossary on the subject field to find more details about IT (Information Technology) solutions wording.

Figure 15:
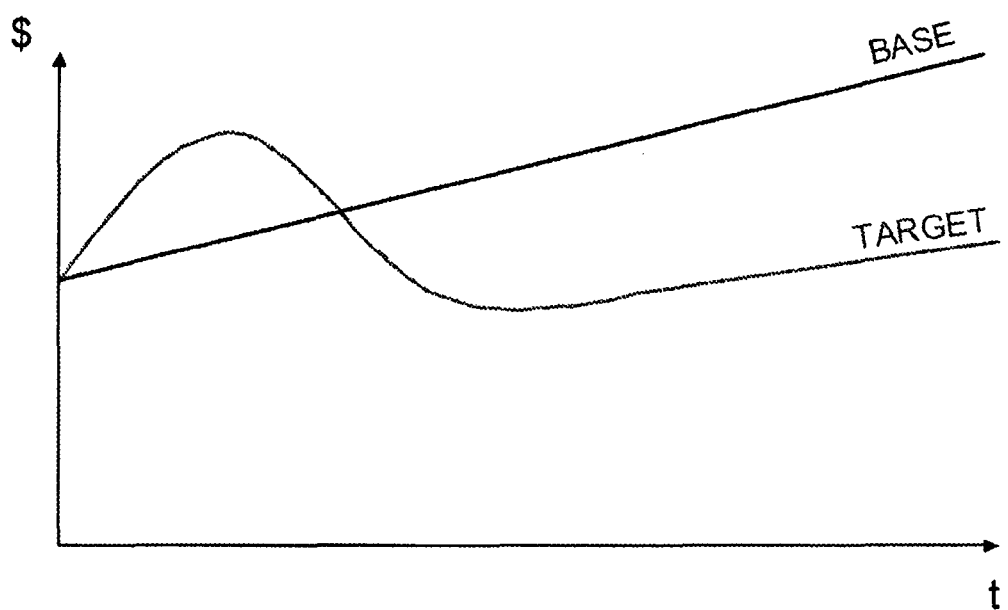
FIG. 15 shows a graph comparing a base curve with a target curve for a business case.

A "Business case" is an assessment of all the impacts (cost and benefits) of proceeding with a project. One common method to generate a Business case is to compare, on an equivalent time period, a "Base" situation to a "Target" situation as shown in FIG. 15. The "Base" curve represents the evolution in time of the current situation of a customer if no project is implemented, while the "Target" curve represents the evolution in time of the same current situation if a project is implemented.

Figure 16:
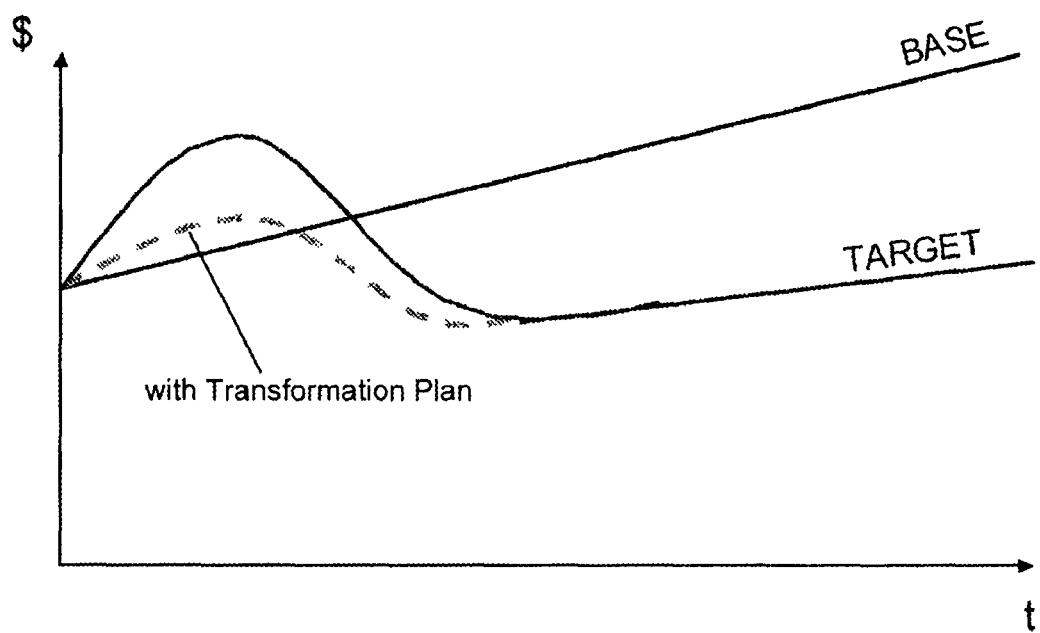
FIG. 16 shows the graph of FIG. 15 with the target curve being modified by a transformation plan.

One important characteristic of the present invention is to take into account the time required to implement the project. Such factor is defined by a "Transformation Plan" which includes the time and costs necessary to implement the project. FIG. 16 illustrates how a Target curve is modified by applying a Transformation Plan to a current situation.

The system and method of the present invention may be viewed for explanation purposes, in two phases: preliminary and execution.

In the preliminary phase there are several steps that include: (a) identify categories to be evaluated; and (b) collect user data for each category. The data are divided into two types: data related to costs, and data related to dates and duration.

The categories to be evaluated are identified after a detailed analysis of the customer environment. In the example to be hereinafter more detailed, i.e., an IT infrastructure consolidation, the categories may include Servers, Software, Full Time Equivalents (FTE), and Facilities. For each of these categories, an inventory is realized to collect all user data related to costs and timing.

Figure 1:
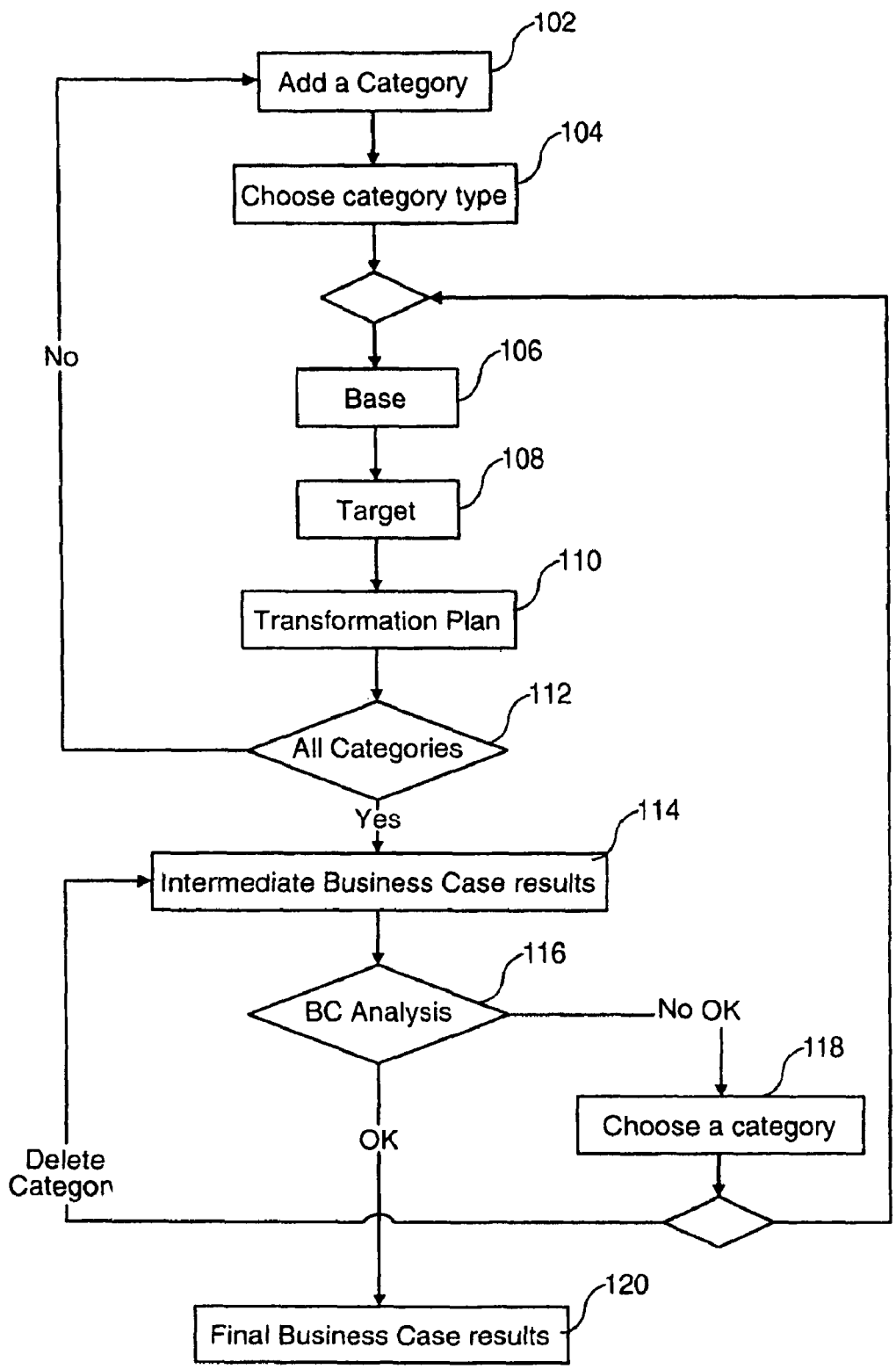
FIG. 1 shows a flow chart of an embodiment of the present invention showing steps of using the invention.

In the execution phase, the data collected are processed by the method of the present invention to generate a Business Case. The execution phase is now described with a first reference to FIG. 1 where a general flow chart of the main steps for building a business case is shown. Each step of FIG. 1 is further detailed with reference to FIGS. 2 to 14. The steps of FIG. 1 may be implemented by a computer processor as computer program code in combination with the appropriate hardware. This computer program code may be stored on computer readable storage media such as diskettes, hard disk, CD-ROM, DVD-ROM or tape, as well as a memory storage device or collection of memory storage devices such as read-only memory (ROM) or random access memory (RAM). Additionally, the computer program code can be transferred to a workstation having a computer processor over the Internet or some other type of network.

Figure 4:
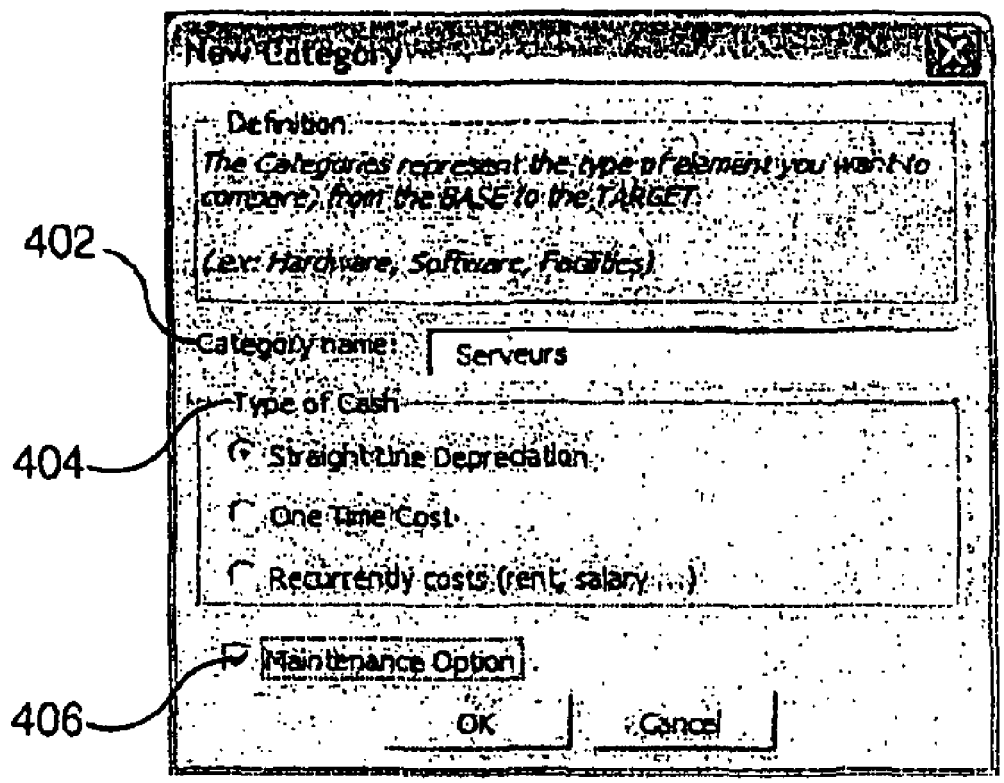
FIG. 4 shows a representation of a dialog box to add a new category.

At first step 102, one of the categories previously identified is input through an input worksheet (FIG. 4). Next, in step 104 the type of data is chosen for the category (FIG. 6). In step 106, a "Base" situation is generated (FIGS. 5 to 8). The "Base" view represents all the costs and their evolution for the customer current situation for a referenced period with no project implementation. In step 108, a "Target" situation is generated (FIGS. 9-10). The "Target" view represents all the costs and their evolution in the hypothesis that the project is implemented in the client environment.

Figure 11:
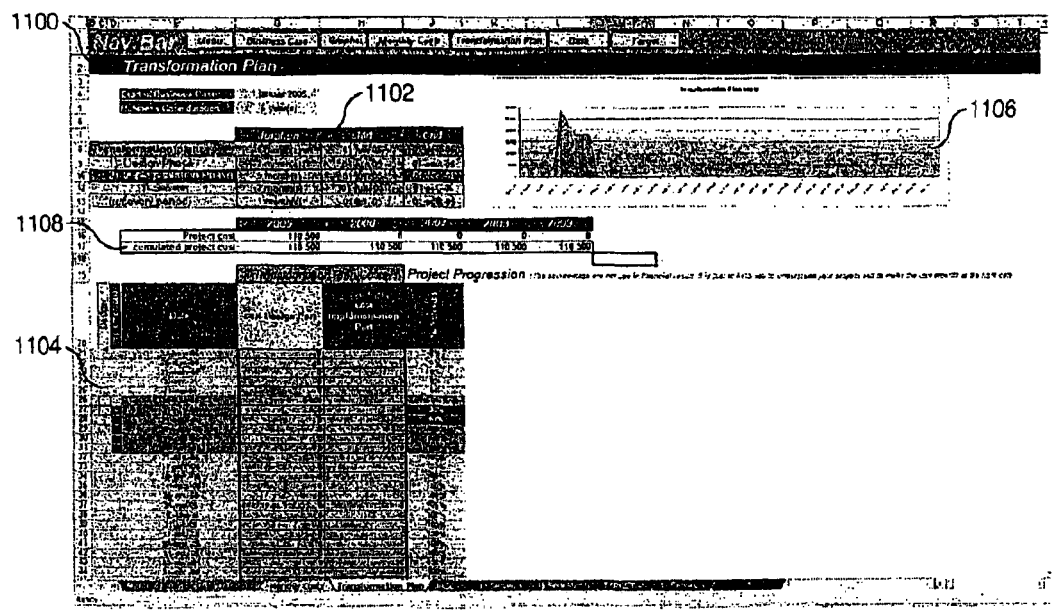
FIG. 11 illustrates a "Transformation Plan" worksheet.

In step 110, a "Transformation Plan" is generated (FIG. 11). In step 112, the process checks if all the categories previously defined have been evaluated. If not, the process goes back to step 102 to allow a new category to be added, otherwise the process goes to step 114, meaning that for each category a Base, a Target, and a Transformation Plan have been generated.

Figure 12:
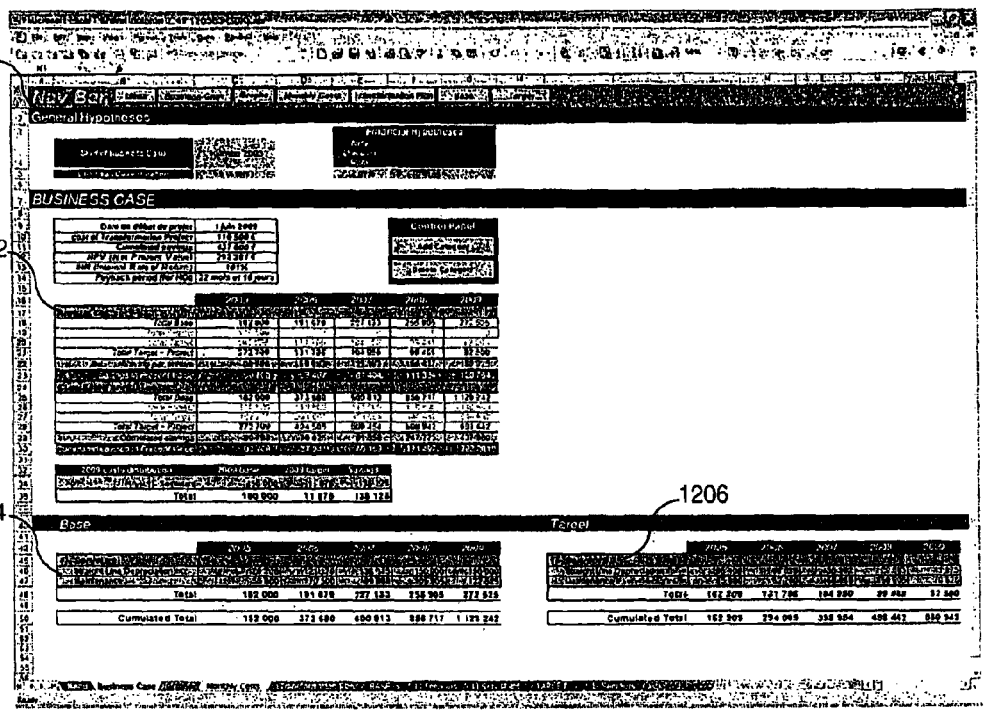
FIG. 12 illustrates a "Business Case" worksheet for one category.
Figure 13:
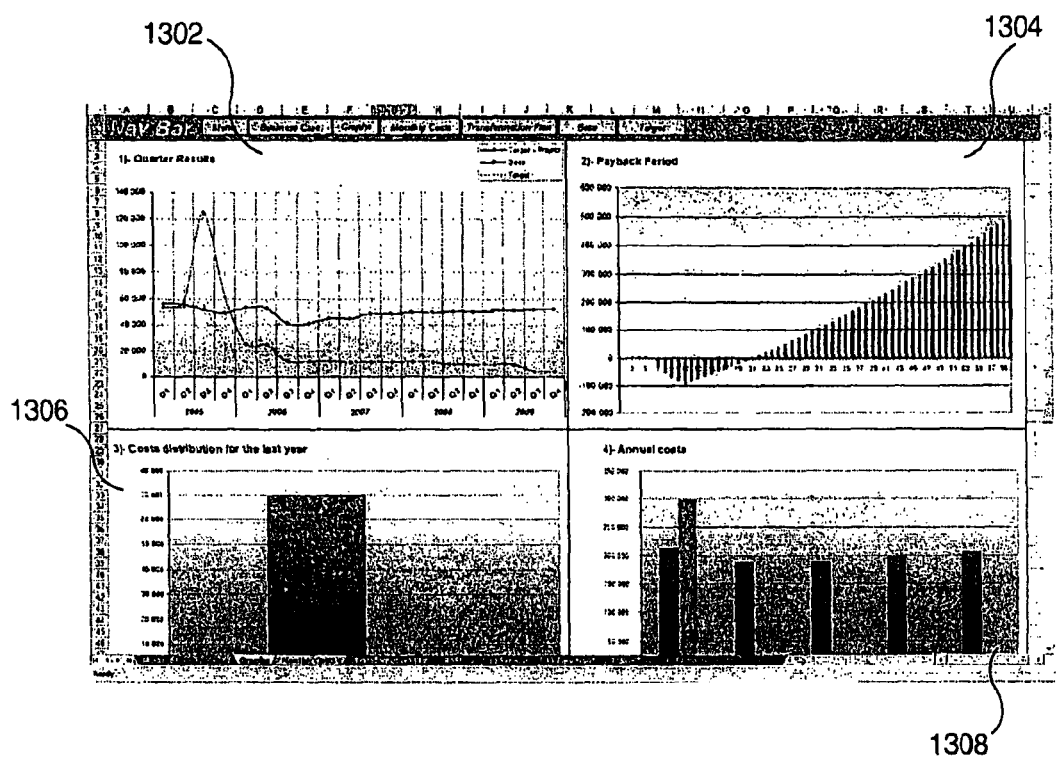
FIG. 13 shows a graphic view of an intermediate Business Case.
Figure 14:
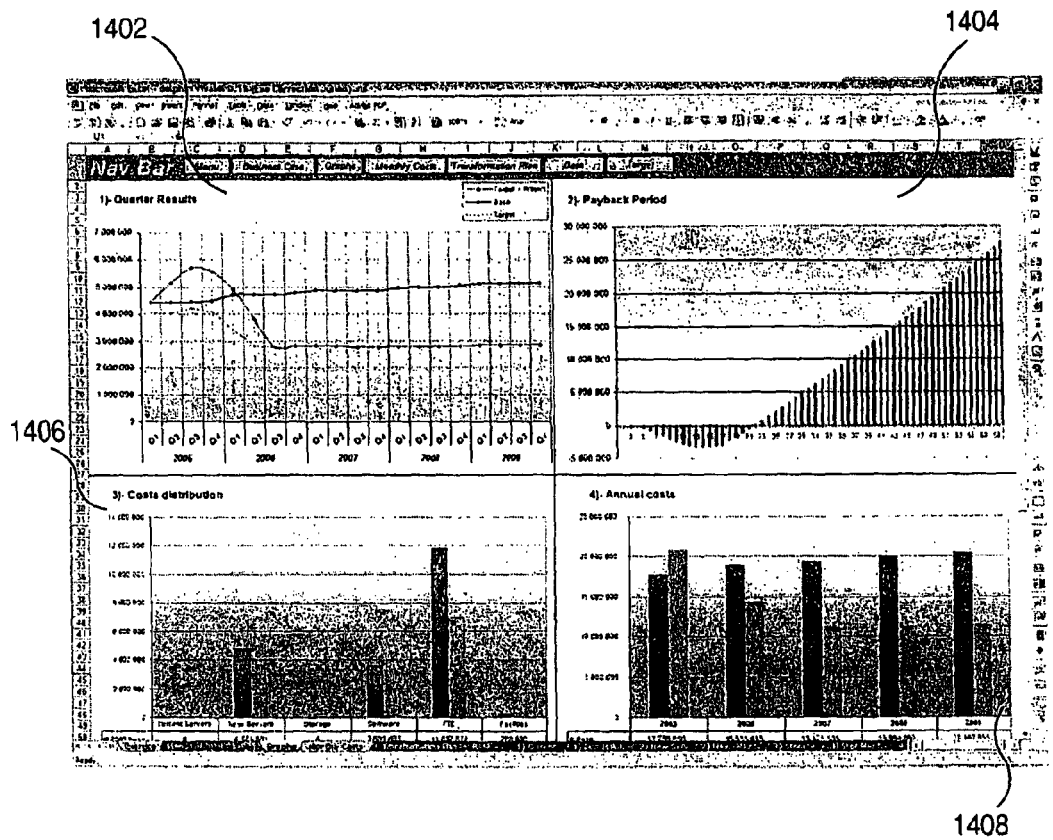
FIG. 14 shows a graphic view of a final Business Case.

In step 114, a consolidated Business Case is generated and then analyzed in step 116 (FIG. 12). According to the result of the analysis step, the process allows selection of a category (step 118) to be either modified or deleted. If the selected category is to be modified, then the process loops back to step 106 to generate a new Base, new Target and new Transformation Plan based on modified hypothesis. If the selected category is to be deleted, then the process goes back to step 114 to generate a new consolidated Business Case. If the result of the analysis in step 116 is satisfying, then the process ends in step 120 with the generation of a final Business Case (FIGS. 13-14).

Generation of a Business Case model using the system and method of the present invention is now exemplified with reference to FIGS. 2 to 14, directed to an infrastructure consolidation analysis, although the system and method should not be limited to such an application. The system and method is also applicable to nearly any analysis in any commercial or consumer product business environment or industry, including service industries, as one of ordinary skill in the art should recognize. Thus, the system and method of the invention should not be limited to any one business environment.

In the chosen example of an IT infrastructure consolidation, four cost impacted categories are selected for building the Business Case:

(1) Servers;
(2) Software;
(3) Full Time Equivalents (FTE); and
(4) Facilities.

For the sake of simplicity, the process is now detailed for only one category (Servers) and the person skilled in the art would easily understand how to apply the same methodology to the others categories in an iteration approach.

Figure 2:
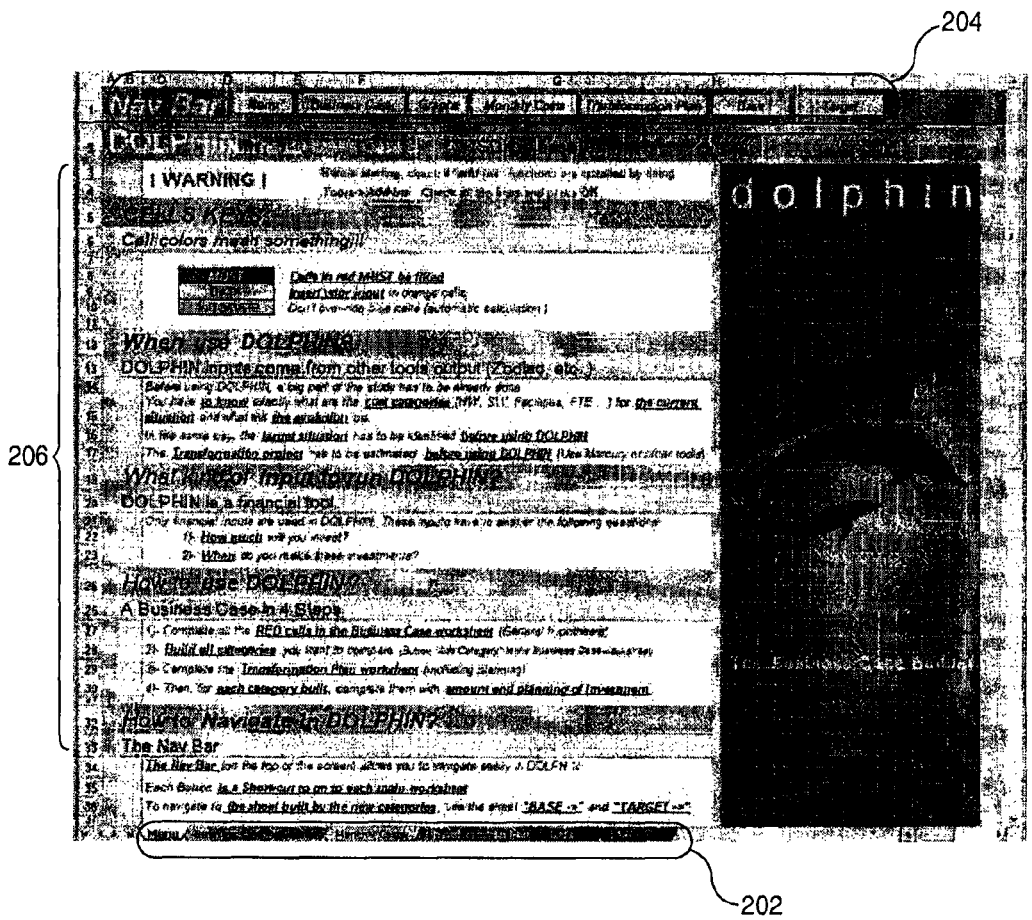
FIG. 2 shows a GUI example of the starting page of the system of the invention.

Referring to FIG. 2, a general presentation of the tool as first appearing to a user is described. As shown on a bottom area 202, several general worksheets are proposed: Menu, Business Case, Graphs, Monthly Costs, Transformation Plan, Base, and Target. These latter will be filled in by the user's inputs to allow the creation of the business case. To facilitate the navigation in the tool and because the number of worksheets preferably increases with the creation of categories, shortcut button are preferably created as shown in the top "Nav-Bar" area (204). A user guide area 206 preferably offers the user a 'how to use' the tool.

Figure 3:
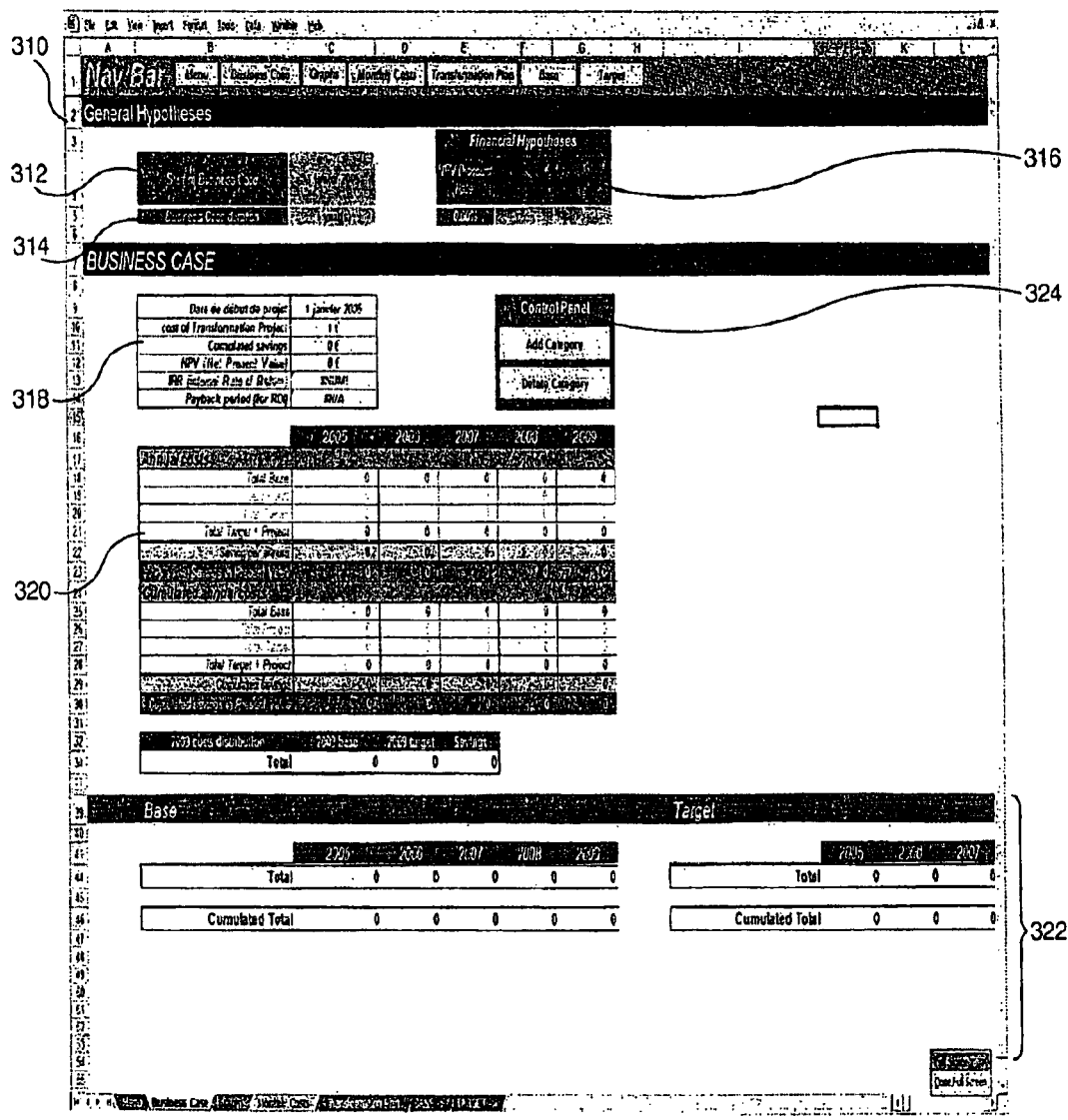
FIG. 3 illustrates a business case synthesis dashboard.

Referring now to FIG. 3, a general empty dashboard of a business case that will be completed after the different calculations in each intermediate worksheets is shown. The Business Case sheet is a dashboard to drive/adapt the business case. A first area (310) groups several general hypotheses for the business case related to timing and financial values. As pointed by arrows 312, 314, and 316 these hypothesis may be the starting date of the business case (312), the business case duration (314) and the Net Present Value (NPV, 316).

A second area (318) groups some information related to the general results of the business case, such as, the 'Cumulative savings', the 'NPV', the 'Internal Rate of Return IRR' or the 'Payback period for ROI'. A third area (320) presents some annual results of the business case. A fourth area (322) Base/Target, here appearing at the bottom of the dashboard, shows annual information related to the Base and annual information related to the Target. A control panel area (324) allows the user to add or delete categories.

This sheet is preferably displayed to the user at the beginning of any study (step 102), at the intermediate analysis (steps 112, 116) and at the end of the process (step 120) to display the final results of the business case.

Referring now to FIG. 4, a dialog box to create a new category is shown which is the illustration of steps 102 and 104. This dialog box is preferably displayed to the user when clicking on the "Add Category" button (324 in FIG. 3). The category name (402) is filled (here in the exemplary study, "Servers"). The user is also offered with choosing the "Type of Cash" (404) to be applied to the category. Three types of cash are proposed: (a) Straight Line Depreciation, used for goods which can be depreciated; (b) One Time Cost, used for goods which can't be depreciated or to have a result in investment cost; or (c) Recurrent Costs, such as renting costs. For each category created, the most appropriate type of cash is chosen. Another optional choice is preferably offered to the user, i.e., a 'Maintenance' option (406) if maintenance costs have to be integrated in the business case. To summarize the choices in the example case study, for the first category 'Servers' of the case study, the hardware is evaluated in straight line depreciation and having a maintenance cost.

Figure 5:
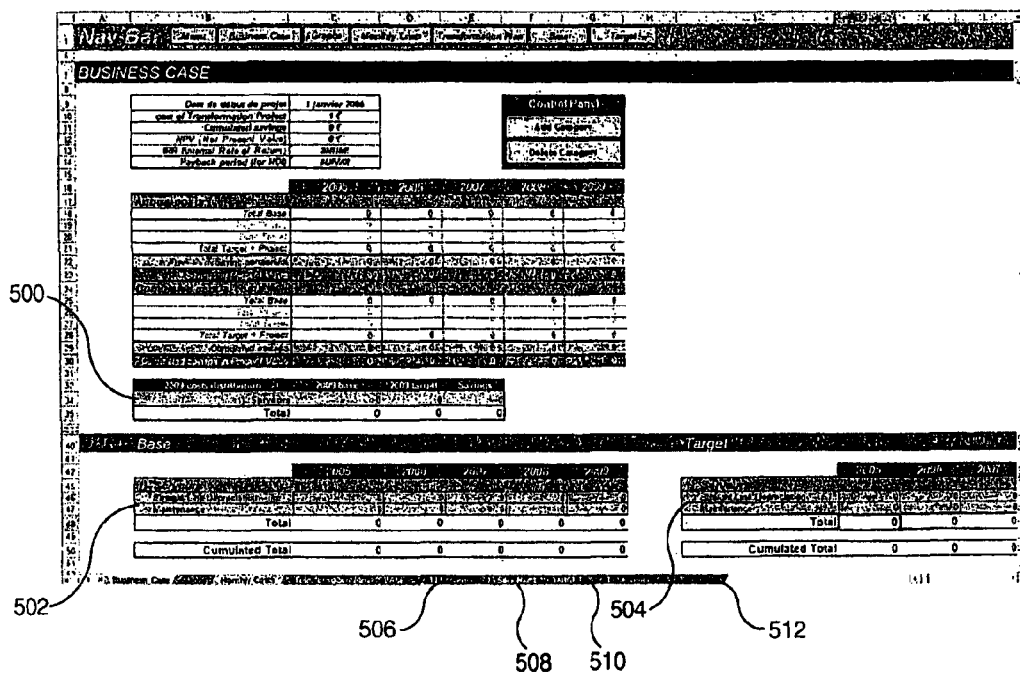
FIG. 5 illustrates a business case worksheet for a new added category.
Figure 6:
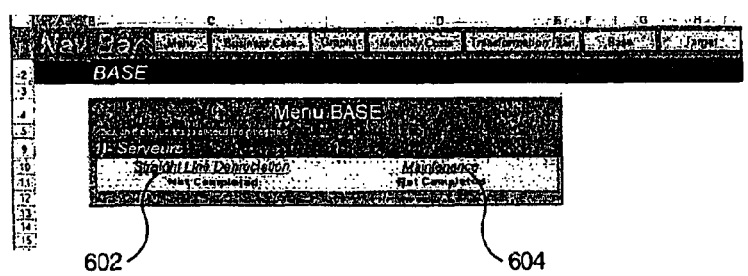
FIG. 6 shows a view of the 'Base' menu showing options for a new added category.

FIG. 5 illustrates a resulting business case worksheet when a new category is added along with the cash and maintenance options chosen in the way previously described. As shown in the Business Case area (318, 320 of FIG. 3) and in the Base/Target area (322 of FIG. 3), new rows have been added (respectively 500, 502 and 504) to include these options. In addition, new Base and Target worksheets are created. Two Base worksheets are created to evaluate the Base with the options: a 'Straight Line Depreciation Base' worksheet (506); and a 'Maintenance Base' worksheet (508). Two Target worksheets are created to evaluate the Target with the options: a 'Straight Line Depreciation Target' worksheet (510) and a 'Maintenance Target' worksheet (512).

After the step of adding a new category, the next step is to evaluate the Base (step 106). To access the Base calculation process, the user preferably clicks on the Base button in the Nay-Bar and a 'Menu Base' window appears (FIG. 6) preferably having links (602, 604) allowing access to the previously Base worksheets created, 'Straight Line Depreciation Base' and 'Maintenance Base'.

Figure 7A:
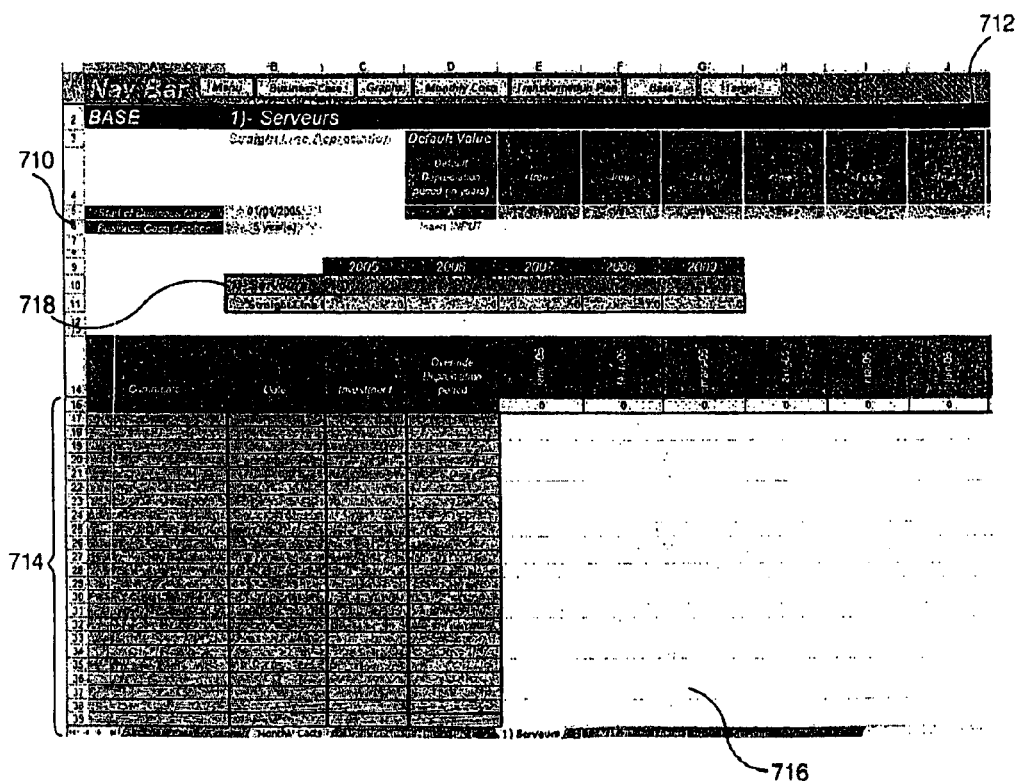
Figure 7B:
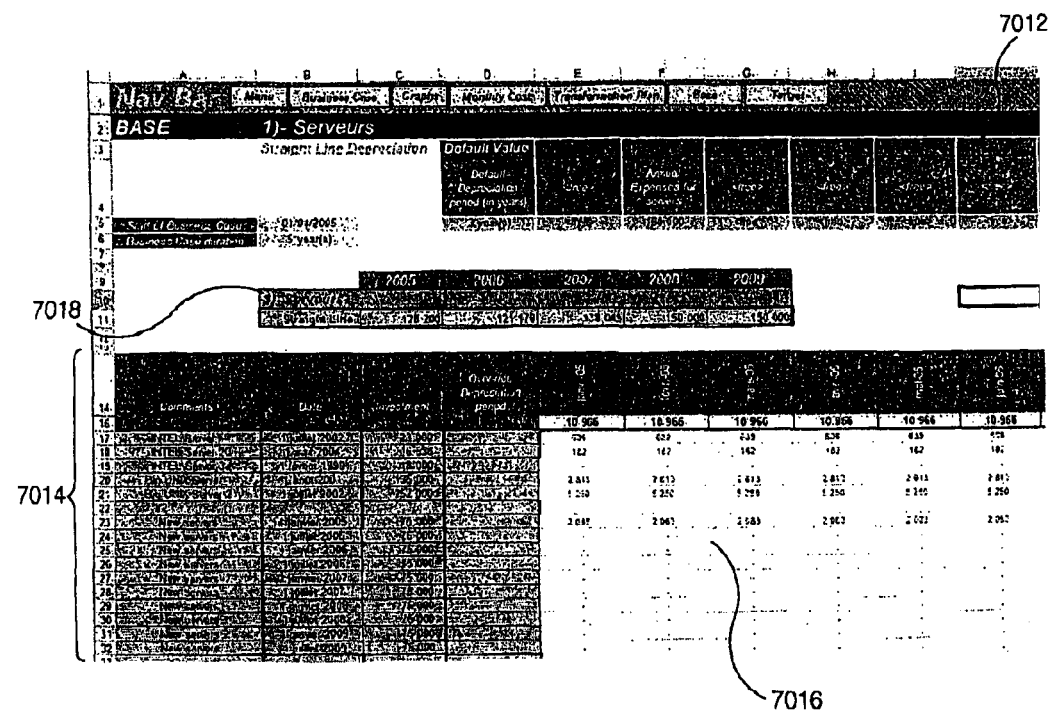

FIGS. 7a and 7b respectively illustrate empty and completed 'Straight Line Depreciation Base' worksheets with the 'Straight Line Depreciation' hypothesis. FIG. 7a is the empty sheet to evaluate the costs evolution for the selected category during the referenced time period (710) as indicated amongst the general hypothesis (312, 314). A first area (712) preferably allows the user to indicate some values specific to this calculation. For example a "default depreciation period" is a mandatory value for such type of category. Several empty fields <free> allow adding of the chosen values. An example is shown on FIG. 7b.

A server data area (714) preferably allows the customer to input data related to the selected category, such as the list of the servers, their acquisition date and their price for example. A cost area (716) split over several time periods displays automatically for each row of the server data area the respective expense. An 'Annual Costs' area (718) is automatically completed once the customer values are input.

FIG. 7b illustrates the previous 'Straight Line Depreciation Base' worksheet as completed with the results obtained by the hypothesis described for FIG. 7a. The cost area (7016) and the Annual Costs (7018) are completed. For this specific example, a depreciation period of three years has been taken which gives an Annual Expense of '150 000' (7012) for the servers listed in the server data area (7014).

Figure 8:
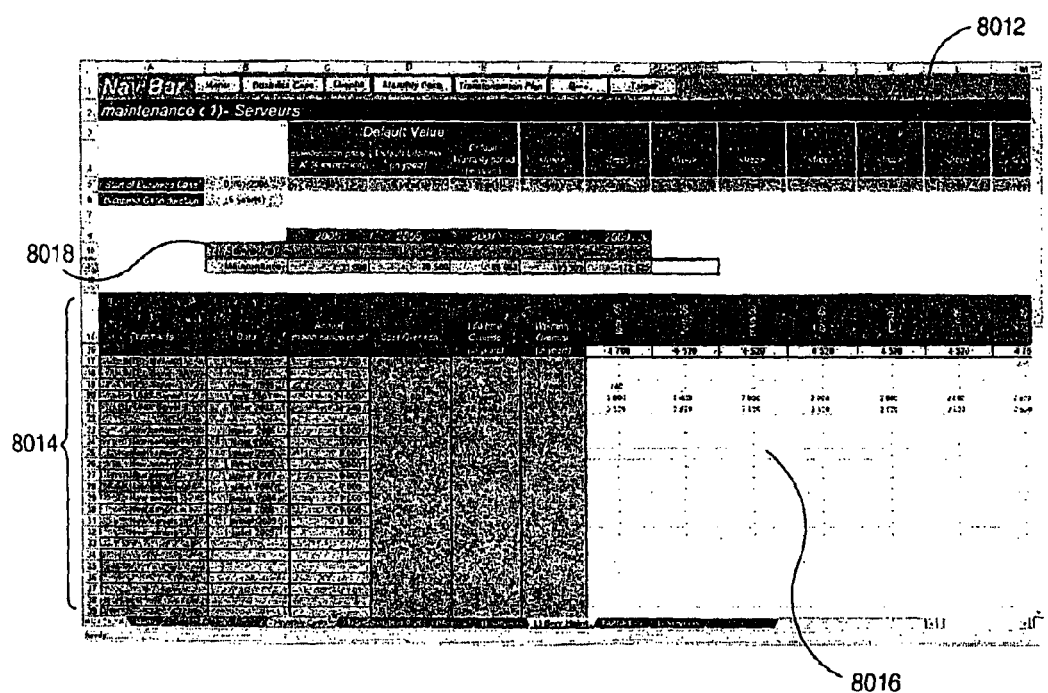
FIG. 8 illustrates a 'Maintenance Base' worksheet.
Figures 9, 10:
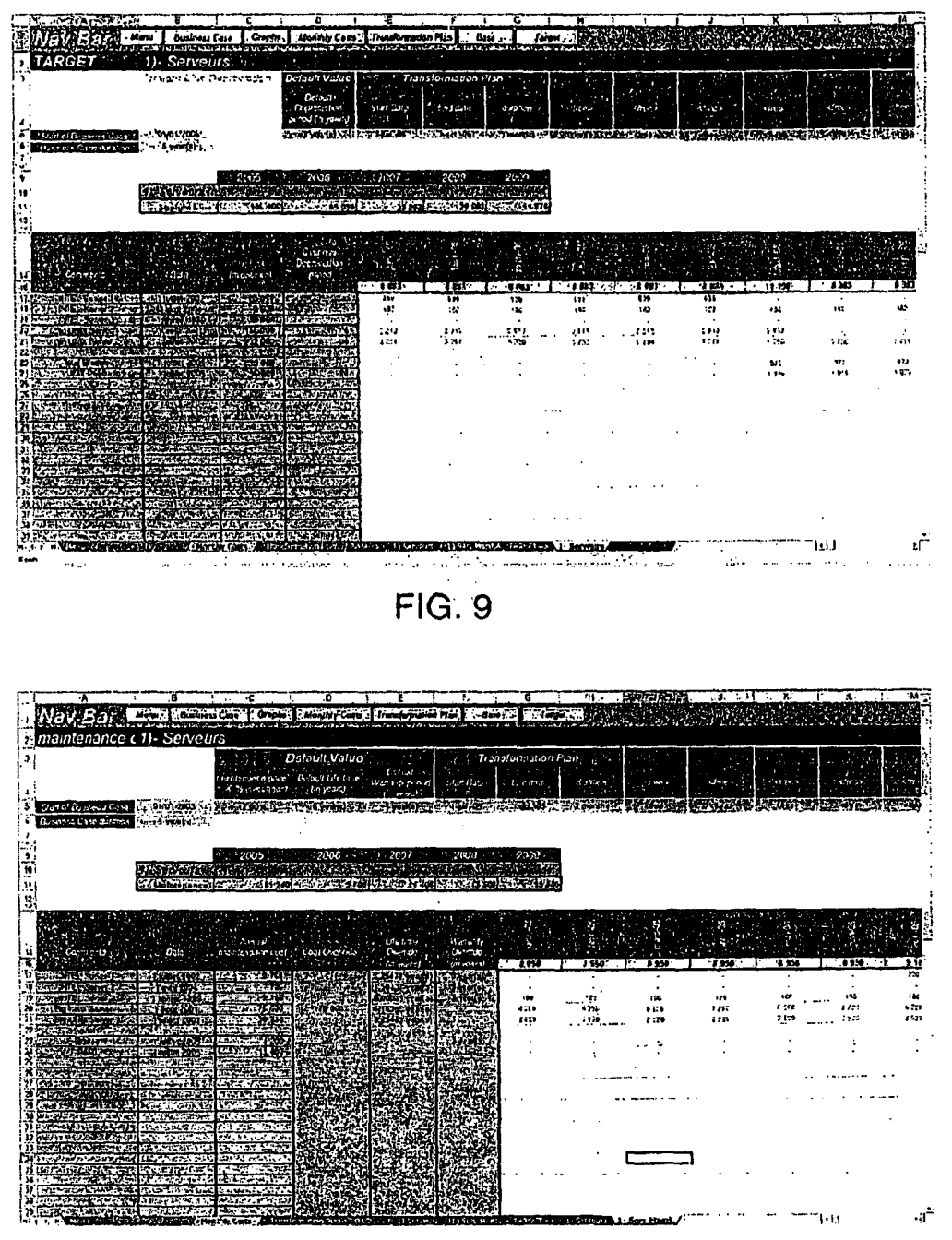

Referring now to FIG. 8, a 'Maintenance Base' worksheet for evaluating the base situation with the hypothesis of a Maintenance activity is shown. As previously explained, based on the server data, keyed-in in the server data area (8014), the different calculation areas (8012, 8016, and 8018) are completed. Once the different Base worksheets are completed, the process goes further with the evaluation of the Target situation (step 108). In a way similar to the Base evaluation, Target worksheets are displayed. The user keys in the data required for the calculation and both the 'Straight Line Depreciation Target' and the 'Maintenance Target' worksheets are completed as illustrated in FIGS. 9 and 10 respectively.

Referring back to FIG. 1, at step 110, once the Base and the Target evaluations are completed, a Transformation Plan is associated to the Target as illustrated by the worksheet 1100 of FIG. 11. The Transformation Plan split evaluates the costs for all the steps of the project to reach the Target (mainly the design phase, the implementation phase). The user keys in the information related to the date of the project (starting/ending date) and to the duration of the project (number of months) 1102. Additional transformation costs directly related to the category are evaluated and keyed in (1104). Those additional costs may include service costs and human costs, i.e., all costs that will be generated for the implementation of the project for the category excluding the cost of category itself (excluding the cost of the servers in the present example). Those costs may be evaluated either manually or by using an evaluation cost tool such as the 'Mercury' one from IBM Corporation.

The Transformation Plan worksheet may also include a graphic view (1106) and/or a numeral table (1108) of those costs. During the Transformation Plan completion, a link is created between the information key-in in the Transformation Plan worksheet and the respective Target worksheet for the category selected. Thus, this innovative part of the system and method of the invention provides a dynamic business evaluation tool by which the impact of any modification or adaptation to the project may be directly delivered and appreciated by the user.

Referring back to FIG. 1, at step 112, the process allows addition of a new category if any (branch No) or to go to next step 114. In the example herein described, three categories remain to be evaluated, the 'Software', the 'Full Time Equivalent' and the 'Facilities' as listed initially. Once all Base/Target situations and corresponding Transformation Plans have been analyzed, step 114 allows generation of an intermediate Business Case based on the Base/Target evaluations and corresponding Transformation Plans made during steps 106, 108 and 110.

The intermediate Business Case is generated and edited as a 'business case' worksheet which summarizes the different hypothesis used for the previous calculations. An example of an intermediate Business Case worksheet (1200) for one category (namely the Servers) is shown on FIG. 12. All the information (1202) related to cost (annual costs, savings, cumulated costs, cost distribution, and so) are calculated for the categories already defined (herein only the Server one). For each scenario (the Base and the respective Target) the cumulated costs per category are generated (1204, 1206). Alternatively, the user can display the intermediate Business Case in the form of several graphs as illustrated by FIG. 13 with shows four graphs: a 'Quarter Results' (1302), a 'Payback Period' (1304), a 'Costs distribution for the last year' (1306), and an 'Annual Costs' (1308).

Once the intermediate Business Case has been generated including all the categories, the user proceeds with an analysis of the results provided. Thus, on step 116 the user uses the information provided to evaluate if a final business case is to be generated or if some parameters and hypothesis are to be modified to generate a new intermediate Business Case. A new intermediate business case is generated either by deleting or modifying one or more categories. If a category is deleted, the process loops back to step 114 to generate a new intermediate business case. If a category is to be modified, the process loops back to step 106 to allow the evaluation of the Base, the Target, and the generation of the Transformation Plan with the new assumptions.

If the intermediate Business Case fits the user expectations and needs, then a final Business Case is generated in step 120 and as illustrated by the graphic view of FIG. 14. FIG. 14 shows four graphs: a 'Quarter Results' (1402), a 'Payback Period' (1404), a 'Costs distribution for the last year' (1406), and an 'Annual Costs' (1408) which gives the user a complete view of the impact of the project thereby allowing business decisions evaluation. The 'Quarter Results' graph (1402) allows one to compare the costs between the 'Base', the 'Target' and the 'Target with the project costs.' The 'Payback period' graph (1404) represents the cumulated savings generated between the 'Base' and 'Target with the project costs.' Using this graph, the ROI and the payback period duration may be evaluated. Numeral values are also available in the 'Business case' worksheet.

The 'Costs Distribution' graph (1406) provides a comparison of the annual costs for the last year of the business case period between the 'Base' and 'Target' category by category. From this view, an analyze on the most profitable category can be evaluated. The 'Annual Costs' graph (1408) is a year/year view of the 'Quarter Results' graph.

Thus, as shown, the method and system of the present invention provides for a set of key information that is easily interpretable to help for making business decisions much more rationally. The use of the method and system of the present invention in proposals and engagements improves the service deliverable to the customer by reducing the decision cycle time.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A computer implemented method for evaluating the impact of a project implementation within a customer situation, said method comprising:
   (i) for each category of a plurality of categories associated with the project implementation of a project, creating base profiles, said creating base profiles comprising:
       a computer processor collecting customer data related to cost over a time duration defined by a start date and an end date,
       said processor generating a base profile of cost versus time over the time duration such that the base profile pertains to the project not being implemented,
       said processor generating a target profile of cost versus time over the time duration such that the target profile pertains to the project being implemented without accounting for project costs associated with timing requirements to implement the project,
       said processor generating a transformation profile of cost versus time over the time duration such that the transformation profile pertains to the project being implemented with accounting for said project costs associated with the timing requirements to implement the project,
       wherein the base profile, the target profile, and the transformation profile coincide at the start date,
       wherein the target profile and the transformation profile coincide at the end date, and
       wherein the base profile does not coincide with the target profile and the transformation profile at the end date;
   (ii) after said creating base profiles, generating a business case model, wherein said generating the business case model comprises:
       said processor generating a base cumulative profile of cost versus time over the time duration by cumulating the base profiles of the categories of the plurality of categories,
       said processor generating a target cumulative profile of cost versus time over the time duration by cumulating the target profiles of the categories of the plurality of categories, and
       said processor generating a transformation cumulative profile of cost versus time over the time duration by cumulating the transformation profiles of the categories of the plurality of categories; and
   (iii) said processor displaying the base cumulative profile, the target cumulative profile, and the transformation cumulative profile.

2. The method of claim 1, wherein the plurality of categories consists of servers, software, full time equivalents, and facilities.

3. The method of claim 1, said method further comprising:
   said processor deleting an existing category from the plurality of categories; and
   after said deleting the existing category, repeating said generating the business case model.

4. The method of claim 1, said method further comprising:
   said processor adding a new category to the plurality of categories;
   after said adding the new category, performing said creating base files for the new category; and
   after said creating base files for the new category, repeating said generating the business case model.

5. The method of claim 1, said method further comprising said processor displaying a dashboard comprising a first area, a second area, a third area, a fourth area, and a control panel area:
   wherein the first area includes the start date, the time duration, and a net present value for the business case model;
   wherein the second area includes general results of the business case model, said general results comprising a cumulative savings, a net present value, an internal rate of return, and a payback period for return on investment;
   wherein the third area includes annual results of the business case;
   wherein the fourth area includes annual information relating to the base profile and the target profile; and
   wherein the control panel area enables a user to add a category to and/or to delete a category from the plurality of categories.

6. The method of claim 1,
   said method further comprising said processor displaying the base profile, the target profile, and the transformation profile on a single graph;
   wherein the transformation profile intersects the base profile at a first intermediate time that is after the start time and before the end time;
   wherein the target profile intersects the base profile at a second intermediate time that is after the first intermediate time and before the end time;
   wherein the target profile and the transformation profile coincide at all times between and including a third intermediate time and the end time, said third intermediate time being after the second intermediate time and before the end time;

wherein the transformation profile is between and not coinciding with the base profile and the target profile during an entire time period between but not including the start time and the first intermediate time;

wherein the base profile is between and not coinciding with the transformation profile and the target profile during a total time interval between but not including the first intermediate time and the second intermediate time; and wherein the target profile is between and not coinciding with the transformation profile and the base profile during an entire time interval between but not including the second intermediate time and the third intermediate time.

7. A computer program product, comprising a computer readable storage medium having a computer readable program code stored therein, said computer readable program code configured to be executed by a computer processor to perform a method for evaluating the impact of a project implementation within a customer situation, said method comprising:

(i) for each category of a plurality of categories associated with the project implementation of a project, creating base profiles, said creating base profiles comprising:
collecting customer data related to cost over a time duration defined by a start date and an end date,
generating a base profile of cost versus time over the time duration such that the base profile pertains to the project not being implemented,
generating a target profile of cost versus time over the time duration such that the target profile pertains to the project being implemented without accounting for project costs associated with timing requirements to implement the project,
generating a transformation profile of cost versus time over the time duration such that the transformation profile pertains to the project being implemented with accounting for said project costs associated with the timing requirements to implement the project,
wherein the base profile, the target profile, and the transformation profile coincide at the start date,
wherein the target profile and the transformation profile coincide at the end date, and
wherein the base profile does not coincide with the target profile and the transformation profile at the end date;

(ii) after said creating base profiles, generating a business case model, wherein said generating the business case model comprises:
generating a base cumulative profile of cost versus time over the time duration by cumulating the base profiles of the categories of the plurality of categories,
generating a target cumulative profile of cost versus time over the time duration by cumulating the target profiles of the categories of the plurality of categories, and
generating a transformation cumulative profile of cost versus time over the time duration by cumulating the transformation profiles of the categories of the plurality of categories; and (iii) displaying the base cumulative profile, the target cumulative profile, and the transformation cumulative profile.

8. The computer program product of claim 7, wherein the plurality of categories consists of servers, software, full time equivalents, and facilities.

9. The computer program product of claim 7, said method further comprising:
deleting an existing category from the plurality of categories; and
after said deleting the existing category, repeating said generating the business case model.

10. The computer program product of claim 7, said method further comprising:
adding a new category to the plurality of categories;
after said adding the new category, performing said creating base files for the new category; and
after said creating base files for the new category, repeating said generating the business case model.

11. The computer program product of claim 7, said method further comprising displaying a dashboard comprising a first area, a second area, a third area, a fourth area, and a control panel area:
wherein the first area includes the start date, the time duration, and a net present value for the business case model;
wherein the second area includes general results of the business case model, said general results comprising a cumulative savings, a net present value, an internal rate of return, and a payback period for return on investment;
wherein the third area includes annual results of the business case;
wherein the fourth area includes annual information relating to the base profile and the target profile; and
wherein the control panel area enables a user to add a category to and/or to delete a category from the plurality of categories.

12. The computer program product of claim 7,
said method further comprising said processor displaying the base profile, the target profile, and the transformation profile on a single graph;
wherein the transformation profile intersects the base profile at a first intermediate time that is after the start time and before the end time;
wherein the target profile intersects the base profile at a second intermediate time that is after the first intermediate time and before the end time;
wherein the target profile and the transformation profile coincide at all times between and including a third intermediate time and the end time, said third intermediate time being after the second intermediate time and before the end time;
wherein the transformation profile is between and not coinciding with the base profile and the target profile during an entire time period between but not including the start time and the first intermediate time;
wherein the base profile is between and not coinciding with the transformation profile and the target profile during a total time interval between but not including the first intermediate time and the second intermediate time; and
wherein the target profile is between and not coinciding with the transformation profile and the base profile during an entire time interval between but not including the second intermediate time and the third intermediate time.

13. A system, comprising a computer processor and a computer readable memory unit coupled to the processor, said memory unit containing program code configured to be executed by the processor to perform a method for evaluating the impact of a project implementation within a customer situation, said method comprising:
(i) for each category of a plurality of categories associated with the project implementation of a project, creating base profiles, said creating base profiles comprising:

collecting customer data related to cost over a time duration defined by a start date and an end date, generating a base profile of cost versus time over the time duration such that the base profile pertains to the project not being implemented, generating a target profile of cost versus time over the time duration such that the target profile pertains to the project being implemented without accounting for project costs associated with timing requirements to implement the project, generating a transformation profile of cost versus time over the time duration such that the transformation profile pertains to the project being implemented with accounting for said project costs associated with the timing requirements to implement the project, wherein the base profile, the target profile, and the transformation profile coincide at the start date, wherein the target profile and the transformation profile coincide at the end date, and wherein the base profile does not coincide with the target profile and the transformation profile at the end date;

(ii) after said creating base profiles, generating a business case model, wherein said generating the business case model comprises:

generating a base cumulative profile of cost versus time over the time duration by cumulating the base profiles of the categories of the plurality of categories, generating a target cumulative profile of cost versus time over the time duration by cumulating the target profiles of the categories of the plurality of categories, and generating a transformation cumulative profile of cost versus time over the time duration by cumulating the transformation profiles of the categories of the plurality of categories; and (iii) displaying the base cumulative profile, the target cumulative profile, and the transformation cumulative profile.

14. The system of claim 13, wherein the plurality of categories consists of servers, software, full time equivalents, and facilities.

15. The system of claim 13, said method further comprising:

deleting an existing category from the plurality of categories; and after said deleting the existing category, repeating said generating the business case model.

16. The system of claim 13, said method further comprising:

adding a new category to the plurality of categories;

after said adding the new category, performing said creating base files for the new category; and after said creating base files for the new category, repeating said generating the business case model.

17. The system of claim 13, said method further comprising displaying a dashboard comprising a first area, a second area, a third area, a fourth area, and a control panel area:

wherein the first area includes the start date, the time duration, and a net present value for the business case model;

wherein the second area includes general results of the business case model, said general results comprising a cumulative savings, a net present value, an internal rate of return, and a payback period for return on investment;

wherein the third area includes annual results of the business case;

wherein the fourth area includes annual information relating to the base profile and the target profile; and wherein the control panel area enables a user to add a category to and/or to delete a category from the plurality of categories.

18. The system of claim 13, said method further comprising said processor displaying the base profile, the target profile, and the transformation profile on a single graph;

wherein the transformation profile intersects the base profile at a first intermediate time that is after the start time and before the end time;

wherein the target profile intersects the base profile at a second intermediate time that is after the first intermediate time and before the end time;

wherein the target profile and the transformation profile coincide at all times between and including a third intermediate time and the end time, said third intermediate time being after the second intermediate time and before the end time;

wherein the transformation profile is between and not coinciding with the base profile and the target profile during an entire time period between but not including the start time and the first intermediate time;

wherein the base profile is between and not coinciding with the transformation profile and the target profile during a total time interval between but not including the first intermediate time and the second intermediate time; and wherein the target profile is between and not coinciding with the transformation profile and the base profile during an entire time interval between but not including the second intermediate time and the third intermediate time.

* * * * *